Aug. 3, 1948.     R. C. BEYERLE     2,446,406
COUPLING
Filed Sept. 4, 1947
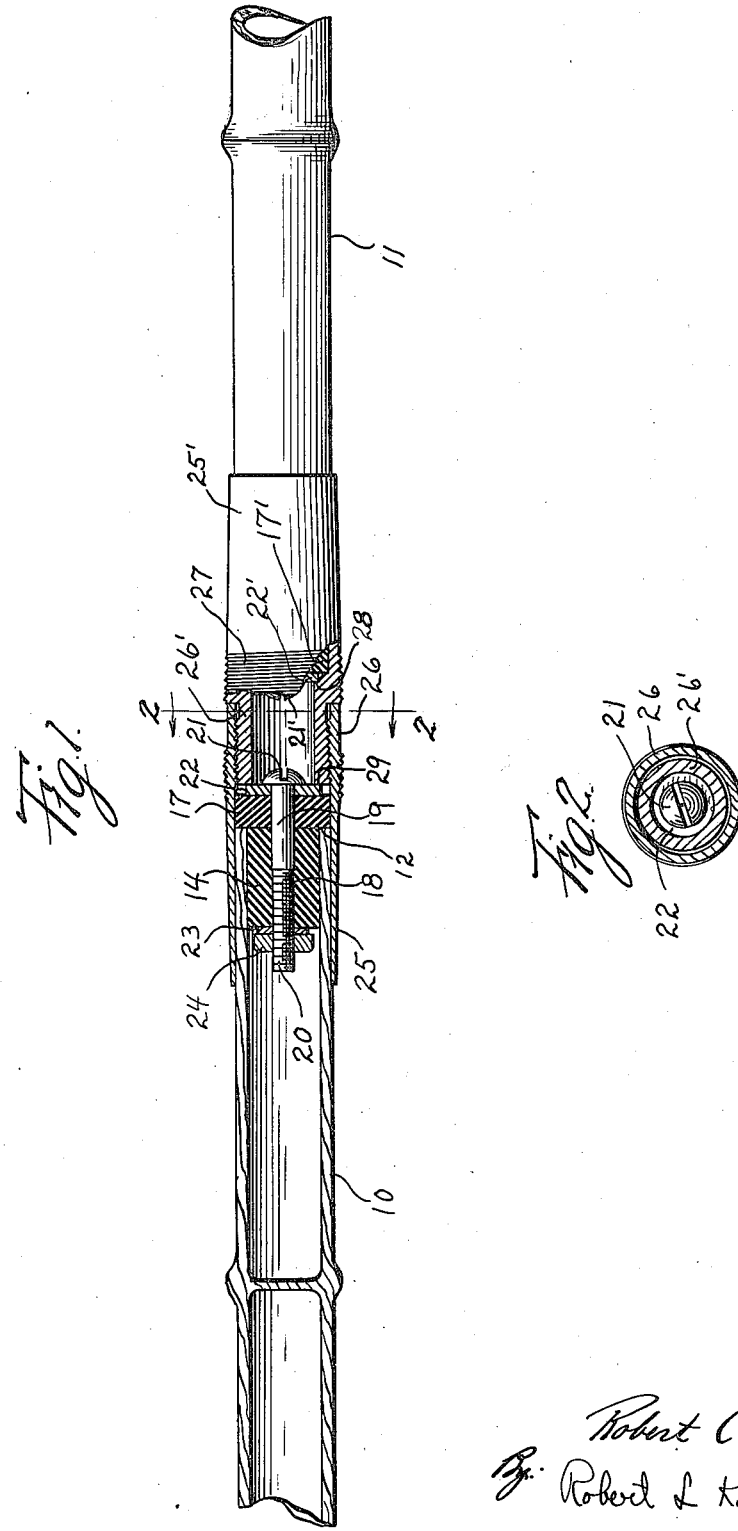
Inventor.
Robert C. Beyerle.
By Robert L. Kahn   Atty.

UNITED STATES PATENT OFFICE 2,446,406

COUPLING

Robert C. Beyerle, Granger, Ind.

Application September 4, 1947, Serial No. 772,141

8 Claims. (Cl. 287—2)

This invention relates to a coupling and particularly to a detachable coupling which may be applied to any desired tube-like members for coupling purposes. The coupling forming the subject matter of the present invention provides a mechanical connection between two normally separate members. Thus, tubes or pipes of any suitable material, such as metal, wood, glass or plastic, may be joined end to end conveniently and in a simple manner by a coupling embodying the present invention. An important feature of the new coupling is its ready adaptability to various sizes of pipes without any machining or cutting operation.

The invention generally comprises a pair of pre-fabricated coupling members adapted to cooperate in a conventional manner. Thus, such coupling members may cooperate either through conventional male or female screw thread connector parts or through cooperating bayonet-type of coupling sleeves. Such pre-fabricated coupling members are rigidly maintained on the pipes to be coupled through compressible expanding means for tightly retaining a pipe and its associated coupling member. The coupling embodying the present invention does not provide for communication between the interiors of the coupled pipe portions and, for that reason, is not adapted for coupling conduits together. The new coupling, however, is so simple and economical that it may be applied wherever jointed pipe or tubular construction is advantageous. Thus, the coupling embodying the present invention may be used in connection with tent poles, fishing rods, small-sized flag poles, walking sticks, umbrellas and the like. Other applications will occur as the invention is described.

The invention will now be described in connection with the drawings wherein Figure 1 is a composite elevation and sectional view through a median plane of a pair of tubular members provided with the new coupling. Figure 2 is a section on line 2—2 of Figure 1.

Tubular portions 10 and 11 may be two portions of tubular members to be coupled together. These tubular members may be of metal, wood such as cane or bamboo, or any other rigid material. Referring specifically to tubular portion 10, end 12 is finished to provide a generally smooth edge. The finish may be provided in the case of wood or metal by conventional sawing. Tubular portion 10 has flexible plug member 14 of any suitable material. Thus, plug 14 may be of rubber, either natural or synthetic, leather or the like. Plug 14 fits within the interior of tube 10 and has its end near or aligned with free end 12 of pipe portion 10. Plug 17 is disposed against finished edge 12 of the pipe. It is understood that both plugs are circular in cross section, and plug 17 has a diameter larger than plug 14.

Plugs 14 and 17 have longitudinal bores 18 axially therethrough and, within these bores, is disposed bolt 19 having threaded portion 20 and bolt head 21. Bolt head 21 bears against metal washer 22 disposed against the outer face of plug 17. Threaded portion 20 of the bolt has washer 23 preferably of the locking type and nut 24.

Telescoping the outer surface of the end of tubular portion 10 is connector sleeve 25 of any suitable rigid material. Thus steel, aluminum, brass or the like may be used. Connector sleeve 25 encloses plug 17 and has coupling portion 26 extending beyond the free end of plug 17. Plug 14 is ordinarily flexible enough so that it may be slipped or forced into the end of pipe portion 10 as shown. Similarly, sleeve 25 may be slipped or forced over plug 17. Thereafter, bolt 19 is turned so that longitudinal compression of the plugs is effected. This forces plug 14 against the opposing interior wall of pipe portion 10 and wedges the plug tightly in position within the pipe end. At the same time, plug 17 is longitudinally compressed and circumferentially expanded to grip the interior of connector member 25.

It is not necessary that connector member 25 have a snug fit over the exterior of pipe end 10. In the event that substantial clearance between connector member 25 and exterior of pipe 10 occurs, it will be desirable to provide sufficient length for connector member 25 so that any lateral movement between the pipe and a connector member will be reduced to a minimum.

Pipe portion 11 is provided with a similar connector unit. In the case of pipe portion 11, connector portion 25' has connector portion 26' extending beyond the free end of the pipe portion. Portion 26' and portion 26 both cooperate to provide actual mechanical engagement. As shown here, portion 26 has an internally threaded portion, while portion 26' has a cooperating externally threaded portion. It is evident that tube 10 and portion 26 may be turned with respect to tube 11 and portion 26' to bring the parts in coupled relationship, as shown in Figure 1. Instead of threaded portions, parts 26 and 26' may be telescoping sleeves with pin and slot arrangements customary in bayonet-type couplings. It is also possible to have portions 26 and 26' similarly threaded and have a separate member functioning as a union. Portions 26 and 26' may both be male coupling elements and may have a nut portion extending over both for maintaining the same rigidly in position. The arrangement shown, however, is preferred, since it is simple and strong.

While plugs 14 and 17 are shown as separate, it is evident that they may be integral. Plugs 17 and 14 may have any desired relationship as far as length and diameter are concerned. In general, it is preferred to have connector portion 25 long enough to overlie the portion of pipe 10 gripped by plug 14. Thus, compression of the wall of pipe portion 10 between plug 14 and connector member 25 may occur. Such compression will tend to make that part of pipe portion 10 more rigid. If desired, the interior surface of connector member 25 may be knurled or roughened to enhance the grip of the plug and pipe thereon. The outer surface of the connector members may also be knurled for appearance as shown at 27.

Instead of a bolt and nut arrangement as shown, it is possible to use eyelets or rivets, in which case the coupling part would have to be assembled with the pipe portion with a suitable riveting machine. It is understood that longitudinal compression of the plug member for each coupling part would be effected prior to turning of the rivet or eyelet. In all cases, the means for providing longitudinal compression on a plug should provide for exerting the compressive force over most of the area of the plug ends. As shown here, this comprises rigid washers 22 and 23. Washer 23 may be of the locking type such as split ring, as one example. In the case of washer 22, it is desirable to have these washers larger in diameter than the inside diameter of the adjacent connector sleeve parts. Thus, sleeve 25' has shoulder 28 against which washer 22' may rest. Similarly, connector portion 26' has free edge 29 against which washer 22 may rest. Thus, as parts 26 and 26' are tightened against each other, connector part 26' will seat against washers 22 and 22' and force the plugs deeper into the pipe portions. If desired, washers 22 and 22' may also be of the locking type in which case parts 26 and 26' will tend to remain tightly locked against uncoupling movement.

It will be evident that a coupling embodying the present invention may be manufactured in quantity with a minimum expense for tooling and assembly. Furthermore, the only portion of the coupling requiring any substantial accuracy are the connector portions wherein the actual coupling is effected. By virtue of the compressible plug, substantial variations in diameter and wall thickness of pipes to be coupled may be tolerated. In the event that the clearance between the interior of sleeve 25, for example, and the exterior of pipe portion 10 becomes excessive, auxiliary rubber sleeves may be disposed therebetween to fill the space.

What is claimed is:

1. A coupling for pipe members, said coupling comprising compressible plugs adapted to fit into the ends of adjacent pipe portions to be joined, said plugs having enlarged plug portions beyond the free end of each pipe portion, connector sleeves, there being two connector sleeves for a complete joint, each connector sleeve fitting over the enlarged plug portion and extending over the end pipe portion, means for maintaining the plug portions for said pipe portions in longitudinal compression to increase the transverse dimensions of said plugs and cause the same to grip the cooperating pipe portions and connector sleeves interiorly thereof and means for readily coupling and uncoupling said connector portions.

2. A jointed tubular construction including a pair of tubular members and coupling means for joining said tubular members together, said coupling means comprising the coupling of claim 1.

3. A coupling for pipe members, said coupling comprising compressible plugs adapted to fit into the ends of adjacent pipe portions to be joined, said plugs having enlarged plug portions beyond the free end of each pipe portion, connector sleeves, there being two connector sleeves for a complete joint, each connector sleeve having an internal diameter larger than the external diameter of the cooperating pipe portion, each connector sleeve being adapted to fit over the enlarged plug portion and over the end pipe portion cooperating therewith, each connector sleeve having a connector portion proper extending beyond the plug portions, means extending axially of said plug portions for compressing said plug portions longitudinally and causing circumferential expansion, said circumferentially expanded plug portions gripping the opposed internal surfaces of the pipe portions and connector sleeves, and means on the connector portions of said sleeves for cooperating to provide a ready coupling therebetween, said connector sleeves being the only portions pre-fabricated to accurate dimensions and said compressible plugs being adapted to permit application of said connector sleeves to pipes having substantial variation in wall thickness and diameter.

4. The coupling according to claim 3 wherein said means for compressing the coupling comprises a nut and bolt assembly.

5. A coupling for pipe members comprising two compressible plugs for each of the two pipe ends to be joined, one plug adapted to fit into a pipe end and an enlarged plug disposed outside of said corresponding pipe member, the remaining plugs being the same for the other pipe end, a pair of connector sleeves, one connector sleeve for each pipe member, said connector sleeves each having an internal diameter larger than the external diameter of the pipe members, a connector sleeve fitting over an enlarged plug and extending over one of said pipe members, a bolt disposed longitudinally through a pair of plugs, nut means cooperating with each bolt to provide longitudinal compression on a pair of plugs for circumferentially expanding the plugs, the one plug being adapted to grip the opposed inner surface of a pipe member and the enlarged plug being adapted to grip the opposed inner surface of the connector sleeve and threaded means for two connector sleeves for coupling the same rigidly together.

6. The coupling of claim 5 wherein said threaded means comprises male and female threaded portions on said sleeves.

7. A joined tubular construction comprising a pair of tubular members and means for coupling said tubular members, said coupling means comprising the coupling of claim 5.

8. The coupling of claim 5 wherein a washer is provided between a bolt and free end face of a compressible plug and wherein one of said connector sleeves has a shoulder engaging one of said washers in the assembled condition of said plug.

ROBERT C. BEYERLE.

REFERENCES CITED

The following references are of record in the file of this patent:

UNITED STATES PATENTS

| Number | Name | Date |
|---|---|---|
| 1,395,419 | Hutchins | Nov. 1, 1921 |
| 1,904,061 | Larson | Apr. 18, 1933 |
| 2,214,177 | Raybould | Sept. 10, 1940 |
| 2,308,542 | Raybould | Jan. 19, 1943 |